(12) United States Patent  (10) Patent No.: US 7,646,377 B2
Geaghan  (45) Date of Patent: Jan. 12, 2010

(54) POSITION DIGITIZING USING AN OPTICAL STYLUS TO IMAGE A DISPLAY

(75) Inventor: Bernard O. Geaghan, Salem, NH (US)

(73) Assignee: 3M Innovative Properties Company, Saint Paul, MN (US)

( * ) Notice: Subject to any disclaimer, the term of this patent is extended or adjusted under 35 U.S.C. 154(b) by 707 days.

(21) Appl. No.: 11/123,529

(22) Filed: May 6, 2005

(65) Prior Publication Data
US 2006/0250381 A1 Nov. 9, 2006

(51) Int. Cl.
G06F 3/41 (2006.01)
(52) U.S. Cl. .................................. 345/173; 345/178
(58) Field of Classification Search ............ 345/156, 345/157, 173–183, 168, 589, 506; 356/73, 356/343, 450, 496–498; 178/18.01, 18.09, 178/18.1, 19.05, 19.04, 20.03, 18.05; 382/124, 382/145
See application file for complete search history.

(56) References Cited

U.S. PATENT DOCUMENTS

| 4,190,831 | A | | 2/1980 | Stahle et al. | |
|---|---|---|---|---|---|
| 4,390,873 | A | | 6/1983 | Kirsch | |
| 4,712,100 | A | | 12/1987 | Tsunekuni et al. | |
| 4,806,707 | A | | 2/1989 | Landmeier | |
| 4,823,394 | A | * | 4/1989 | Berkin et al. | 382/145 |
| 5,051,736 | A | | 9/1991 | Bennett et al. | |
| 5,397,865 | A | * | 3/1995 | Park | 178/18.05 |
| 5,738,429 | A | | 4/1998 | Tagawa et al. | |
| 5,825,666 | A | * | 10/1998 | Freifeld | 702/153 |
| 5,852,434 | A | * | 12/1998 | Sekendur | 345/179 |
| 6,078,312 | A | | 6/2000 | Liebenow | |
| 6,122,042 | A | * | 9/2000 | Wunderman et al. | 356/73 |
| 6,329,995 | B1 | * | 12/2001 | Nagashima | 345/506 |
| 6,377,249 | B1 | * | 4/2002 | Mumford | 345/179 |
| 6,441,362 | B1 | * | 8/2002 | Ogawa | 250/221 |
| 6,491,225 | B1 | | 12/2002 | Dvorkis et al. | |
| 6,548,768 | B1 | | 4/2003 | Pettersson et al. | |
| 6,570,104 | B1 | | 5/2003 | Ericson et al. | |
| 6,663,008 | B1 | | 12/2003 | Pettersson et al. | |
| 6,667,695 | B2 | | 12/2003 | Pettersson et al. | |
| 6,689,966 | B2 | | 2/2004 | Wiebe | |
| 6,698,660 | B2 | | 3/2004 | Fahraeus et al. | |
| 6,965,377 | B2 | * | 11/2005 | Yanagisawa et al. | 345/173 |
| 7,009,713 | B2 | * | 3/2006 | Seko et al. | 356/498 |
| 7,190,348 | B2 | * | 3/2007 | Kennedy et al. | 345/168 |
| 7,259,754 | B2 | * | 8/2007 | Sasaki et al. | 345/179 |
| 2003/0034961 | A1 | | 2/2003 | Kao | |
| 2004/0004723 | A1 | * | 1/2004 | Seko et al. | 356/498 |
| 2004/0229195 | A1 | * | 11/2004 | Marggraff et al. | 434/169 |

(Continued)

FOREIGN PATENT DOCUMENTS

EP 0 926 621 6/1999

(Continued)

Primary Examiner—Prabodh M. Dharia
(74) Attorney, Agent, or Firm—Steven A. Bern

(57) ABSTRACT

The present invention provides systems and methods of using an stylus that houses optics and a detector capable of imaging display pixels. Stylus position is determined according to the number and direction of imaged pixels passing through the field of view of the stylus optics. Stylus orientation, including rotation and tilt, stylus height, stylus contact state, and stylus pressure may also be determined.

19 Claims, 3 Drawing Sheets

U.S. PATENT DOCUMENTS

| | | | |
|---|---|---|---|
| 2004/0252867 A1* | 12/2004 | Lan et al. | 382/124 |
| 2005/0051711 A1* | 3/2005 | Xie et al. | 250/221 |
| 2005/0090743 A1* | 4/2005 | Kawashima et al. | 600/443 |
| 2005/0110777 A1* | 5/2005 | Geaghan et al. | 345/179 |
| 2005/0110781 A1* | 5/2005 | Geaghan et al. | 345/180 |
| 2005/0126027 A1* | 6/2005 | Hajdukiewicz et al. | 33/558 |
| 2005/0162400 A1 | 7/2005 | Tseng et al. | |
| 2006/0028457 A1* | 2/2006 | Burns | 345/179 |
| 2009/0102855 A1* | 4/2009 | Brown Elliott et al. | 345/589 |

FOREIGN PATENT DOCUMENTS

| | | |
|---|---|---|
| WO | WO 97/022959 | 6/1997 |
| WO | WO 02/058029 | 7/2002 |
| WO | WO 2005/010823 | 2/2005 |

* cited by examiner

POSITION DIGITIZING USING AN OPTICAL STYLUS TO IMAGE A DISPLAY

The present invention relates to digitizing user input devices.

BACKGROUND

Touch sensors can provide a simple and intuitive way for a user to interface with a computer system, particularly for handheld and mobile computing applications. As mobile computing applications become more powerful, and users demand functionalities such as handwriting recognition, direct note taking on a computer platform, drawing, and so forth, additional requirements are placed on the input device in terms of accuracy and functionality.

SUMMARY

The present invention provides a digitizer system that includes a pixelated display device, an optical stylus configured to image the pixels within a field of view, and electronics configured to determine the distance and direction of travel of the optical stylus from a reference point based on the number and direction of pixels passing through the field of view of the optical stylus. If desired, the absolute position of the stylus can be tracked one the absolute coordinates of a reference point are obtained. In some embodiments, the reference point can be obtained by using the stylus to image a feature such as a tracked cursor or a coded pattern indicative of position that is displayed by the display device. Digitizer systems of the present invention may be advantageously employed in any system where stylus or pen based input on a display is desired, for example in a tablet PC or other mobile computing device application.

The present invention also provides a method of detecting stylus position relative to a pixilated display device. The method can include imaging the display pixels using optics and a detector housed by the stylus, the optics and detector providing a field of view, and obtaining stylus position relative to a reference point by determining the number of pixels and direction of stylus travel as imaged pixels pass through the field of view.

In some embodiments, systems and methods of the present invention may be configured to determine stylus tilt, angular orientation, height over the display, or pressure against the display.

The above summary of the present invention is not intended to describe each embodiment or every implementation of the present invention. Advantages and attainments, together with a more complete understanding of the invention, will become apparent and appreciated by referring to the following detailed description and claims taken in conjunction with the accompanying drawings.

Figure 1:
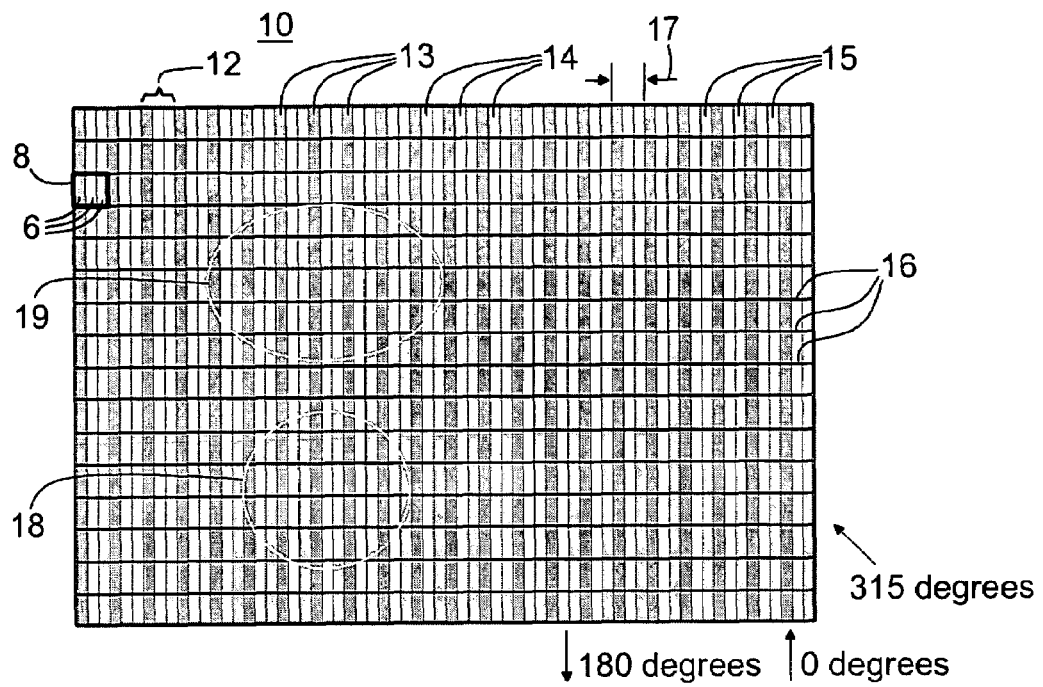
FIG. 1 schematically shows a linear pattern of pixels and subpixels as may be present in an electronic display, and which may be imaged in methods and systems of the present invention.

While the invention is amenable to various modifications and alternative forms, specifics thereof have been shown by way of example in the drawings and will be described in detail. It is to be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION

Movement of an image detecting, or optical, stylus relative to a display may be measured by "dead reckoning," in other words by determining the vector (distance and direction) traversed by the optical stylus. For example, distance and direction can be determined by counting the number of pixels or other displayed image features that cross the field of view of the stylus in at least two axes as referenced to an initial point and stylus orientation. Dead reckoning may thus be used to measure stylus movements, giving relative positional information with resolutions on the order of pixel size. Absolute position can be established when the absolute coordinates of the stylus initial position is known. Initial position can be determined in a number of ways, including by displaying a location-specific pattern on the display that can be imaged by the stylus. Such a location-specific pattern can be displayed periodically, for example on a scheduled basis, on the occurrence of an event (for example, where the stylus is brought sufficiently close to the display), and so forth. A location-specific image can be displayed for a sufficiently short duration so as to limit any distraction to the user, for example for about 100 milliseconds or less, while still being imageable by the optical stylus.

The present invention differs from known techniques in that pixels, subpixels, or other display image elements are imaged by an optical stylus to determine and monitor stylus movements without disrupting display viewability. Absolute position of a stylus on a display may be determined by stylus detection of a cursor or pattern with known optical characteristics. Methods of light pen location by this method are known in the art. Cursor shape or pixel pattern, color, brightness, and/or contrast versus background may be used to recognize a cursor, and the position of the stylus may then be calculated relative to the known cursor position. A cursor may track the movement of an optical stylus under software control like a mouse cursor. U.S. Pat. No. 6,377,249 discloses a light pen that detects a specific color or intensity of light that is unique to an area of a displayed image. The unique color/shade locator image must be continuously scanned across the displayed image or a unique cursor must track the stylus position. U.S. Pat. No. 6,377,249 also discloses a system in which a fixed-position CCD camera monitors a projected image. The image may include a spot from a laser pointer. The CCD image can be used to determine the location of the laser pointer, and such is primarily useful only for projection displays. Most known light pens detect a displayed cursor that tracks the position of the light pen. Given display refresh rates of less than 120 Hz, a large and obtrusive tracking cursor is required to track fast light pen movements.

As such, there is a need for a digitizer system that can track stylus movements, preferably with a high resolution and fast sampling rate, without disrupting display viewability by displaying persistent patterns or tracking cursors that may be obtrusively noticeable to the user. An advantage of the present invention is that relative stylus movements may be measured by dead reckoning via pixel counting, so it is not necessary for a cursor to move at the same rate as the stylus.

Establishing an initial absolute position can be combined with measuring stylus movements via pixel imaging to track absolute stylus location by dead reckoning. Dead reckoning allows accurate position measurement during stylus movement without continuously displaying a moving cursor or scanning a locator image across the displayed image, which may interfere with user operation. Occasional absolute location plus dead reckoning can be performed in a manner that is much less noticeable to a user, if noticeable at all, and thus less intrusive.

The present invention can provide position detection of a hand-held stylus on a display without the need for modification of the display such as by adding a digitizer overlay. Stylus movement can be measured by determining the number and direction of pixels (or sub-pixels or other image features) as they pass through the stylus field of view. Absolute position of the stylus may be determined initially, and optionally confirmed or updated over time, by image recognition of a unique pattern displayed in a known position, preferably transiently in a way that is not noticeable to a user. Rotational orientation of the stylus may be determined by the relative position of colored sub-pixels, by the polarization orientation of displayed light as seen by the stylus optics, and so forth. Tilt of the stylus can be determined by the "shape" of the image detected by the stylus, for example the number of pixels extending in each direction in the stylus field of view referenced to a stylus held at right angles to the display. Distance of the stylus from a display surface can be determined by the amount of light detected within a conical field of view, for example.

In various embodiments, the present invention can provide digitizer systems and methods that include one or more of the following features in any desirable combination:

an optical stylus that can be used to sense absolute position on a display by recognizing an image unique to a specific location;

an optical stylus that can be used to sense movement across a display by recognizing image changes unique to a specific distance, rate, and/or direction of movement;

display driver hardware that can generate images (e.g. halftones) that allow absolute position and/or movement to be measured by an optical stylus;

display driver software that can generate images (e.g. halftones) that allow absolute position and/or movement to be measured by an optical stylus;

an optical stylus that allows detection of stylus movements relative to a display by counting the number of pixels crossing a portion of the field of view of the stylus, whereby the portion of field of view may be a circle, a ring (for example sufficiently large to straddle dark pixel areas of typical size), a cross, or combinations thereof, and further where lighted pixels only or patterns of lighted and dark pixels may be detected;

initial absolute position determination combined with relative tracking of stylus motions;

separately sensing and tracking the red, green and blue (RGB) sub-pixels;

determining rotational orientation of the stylus by the orientation of RGB sub-pixels;

measuring pixel orientation, dimension, or other characteristics during a calibration procedure;

determining rotational orientation of the stylus by the polarization of light received by the stylus, for example when the display is an LCD;

determining the distance of the stylus from the display surface by the apparent distance between pixels or sub-pixels, which may change with distance versus the focal length of the stylus optics;

infinite focal length optics used in the stylus to yield a consistent image size versus stylus distance from the display surface, and in such a case the stylus may be used even at a relatively large distance away from a projection display, for example;

determining stylus tilt angle by the shape of the image, for example a circular shape (equal number of pixels in two orthogonal directions) indicates a stylus angle normal to the display surface whereas an elliptical shape (different number of pixels in two orthogonal directions) indicates a tilt angle from normal (as disclosed in commonly assigned patent application U.S. Ser. No. 10/721,685);

determining stylus distance from the display surface by measuring the total amount of light entering the stylus optics, for example using a conical-beam light detector whereby light entering each of the four quadrants of a conical viewing area may be used as a measurement of stylus distance from the display surface, including the relative amounts of light received by the quadrant detectors being used to measure stylus tilt angle, the relative amounts of light received by the quadrant detectors being used to measure stylus proximity to the edge of a display or the edge of a displayed image or window, the relative colors of light received by the four quadrant detectors being used to measure stylus proximity to the edge of a display or the edge of a displayed image or window, and so forth;

infinite focal length stylus optics combined with conical-beam light detection to measure movement, position, proximity to an edge, and stylus distance from a display;

using the optical stylus as an image recognition device such as a bar code reader or a character recognition device;

using multiple styli to detect multiple locations on a single display;

utilizing a displayed pattern of half-tone, a color variations, or intensity variations unique to a position to locate the absolute position of a stylus, for example to determine a reference position;

displaying a preferably non-obtrusive repetitive pattern to aid the stylus in measuring movement; and a display processor or display driver software that modulates a displayed image to generate patterns independent of application software, for example so that the application software does not have to be modified to generate patterns used by the optical stylus.

FIG. 1 shows a pattern 10 of pixels 8 and subpixels 6 typical for an electronic display such as a liquid crystal display (LCD). Many LCDs use such a pattern of vertical RGB color stripes 12. Other LCDs use a BGR pattern. In the vertical direction, pixels are separated from one another by black horizontal masking lines 16, termed black matrix. Relative movement of a stylus over a display may be measured by counting the repeating color stripes 12 horizontally and counting masking lines 16 vertically.

The rotational orientation of the stylus can be determined by the relative position of RGB color stripes 12, and by the angle of the stripes. For example, when the display is viewed from the 0 degrees rotation indicated in FIG. 1, each red stripe 13 has a blue stripe 15 immediately to the left and a green stripe 14 immediately to the right. Viewed from the indicated 180 degrees rotation, the color pattern is reversed, RGB becoming BGR. Viewed from an angle of 315 degrees, indicated in FIG. 1, color stripes 12 have a relative angle of 45 degrees with a BGR ordering. Similarly, any arbitrary rotational stylus orientation can be determined by the angle and positional relationship of RGB stripes 12 as imaged by the optics of the stylus.

Figure 2:
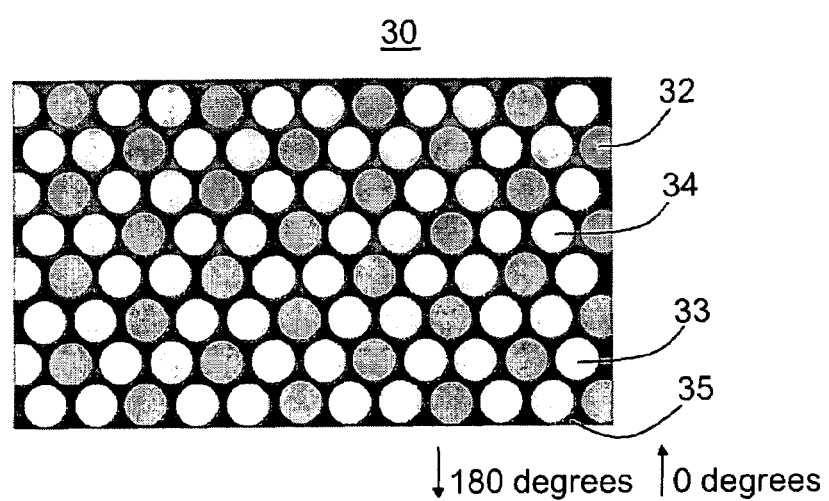
FIG. 2 schematically shows a hexagonal pattern of subpixel dots as may be present in a cathode ray tube display, and which may be imaged in methods and systems of the present invention.

FIG. 2 depicts a dot matrix pattern 30 typical for color cathode ray tube (CRT) displays. Red phosphor dots 32, green phosphor dots 33, and blue phosphor dots 34 are separated from one another by black shadow mask 35. Relative movement of a stylus over such a CRT display may be measured by counting the repeating color dot pattern horizontally or vertically. The rotational stylus orientation can be determined by the relative position of dots 32, 33, 34. For example, at 0 degrees rotation each red dot 32 has a blue dot 34 immediately to its left. Viewed from 180 degrees rotation, blue dots 34 are immediately to the right of red dots 32. Similarly, any rotational orientation angle can be determined by the relationship of red, green, and blue dots as imaged by the stylus.

A calibration procedure may be performed prior to normal use to determine the characteristics of the display such as the pixel pattern, color arrangement, pixel spacing, pixel dimensions, and so forth. For example, a user may be prompted to move the stylus between two defined points, hold the stylus over a spot on the display at different heights, rotate the stylus 360 degrees over a defined spot, or so forth in order to obtain pixel imaging data that can be used to calibrate the digitizer response. Alternatively, the display characteristics can be generated and stored at some point in the manufacture or assembly of the device.

Styli of the present invention may include any desirable features or functionalities useful in pen-based input devices, including tip switches (e.g., for detecting stylus contact with the display and/or stylus pressure upon contact), barrel switches (e.g., for performing right or left mouse click functions or cursor scrolling functions, or to toggle between inking and erasing functions), and so forth. Multiple styli may be used on a single display, such a system preferably capable of distinguishing the communication signals from each of multiple styli. An appropriately focused optical stylus may be used as a pointer with a projection display from a distance of several meters from the display. In some embodiments, the stylus image detector may also be used to recognize specific image types such as displayed characters or bar codes.

Figure 3:
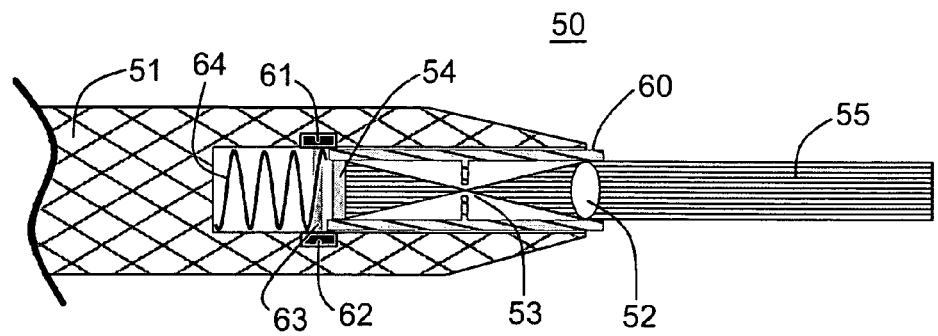
FIG. 3 shows a schematic cross-section of an optical stylus that may be used in the present invention.

FIG. 3 depicts a cross sectional view of an optical stylus 50 that can be used in the present invention. Lens 52 focuses light 55 from a display through aperture 53 onto image detector 54, which may be a CCD array, for example. Lens 52 can be positioned such that a parallel, collimated beam of light 55 is focused on image detector 54. The stylus 50 can have an infinite focal length so it remains focused on a display surface over ranges including when the stylus is contacting the front surface up to when the stylus is several meters from the display surface, for example. Stylus body 51 supports image detector 54, lens 52, and optional tip cylinder 60 that may slide into stylus body 51 when pressure is applied against a display surface. Optional spring 64 returns slideable tip cylinder 60 to its outer position when no pressure is applied. Movement of tip cylinder 60 may activate a switch or a continuously variable motion detector. One example of a switch or motion detector includes the use of a light source 62 and light detector 61 that can determine whether the tip cylinder 60 has been engaged, and optionally the extent to which the tip cylinder 60 has been engaged, upon contact with a surface. In one embodiment, light beam 63 received by light detector 61 from light source 62 is reduced when cylinder 60 moves into stylus body 51 under pressure. The reduction in light received by detector 61 is correlated to the level of pressure applied to cylinder 60, providing contact detection as well as a measure of z-axis motion of the stylus subsequent to initial contact.

Resolution of stylus image detector 54 is preferably high enough to detect individual sub-pixels of the display, whether in the form of color dots or color bars. A resolution of twice the display sub-pixel distance may be sufficient to measure movement across color bars (e.g., horizontally in FIG. 1). Referring back to FIG. 1, a color bar pitch 17 of 0.01 inches and individual color stripe widths of 0.0033 inches, a detector resolution of 0.0016 inches will readily detect individual color bars 13, 14, 15. Dark bars between pixels in a single color bar, (e.g., horizontal black lines 16 in FIG. 1) are narrower than color bars. As such, a higher resolution may be required to discriminate the inter-pixel mask lines and thus to measure vertical movement across the display 10. Resolution of 20 times the pixel pitch may be required to measure position and relative movement of the inter-pixel mask lines. Alternatively or in addition, a pattern may be displayed such that adjacent pixels in the vertical direction are discernable by intensity variation. This can work to reduce the resolution required to measure vertical movement.

Where adjacent pixels have the same color and shade, the image acquisition rate of the stylus optical detector is preferably high enough to discriminate and count movement of individual pixels across its field of view during the fastest expected stylus movements. Where pixels have a pattern of colors or shades, the image acquisition rate of the optical detector is preferably high enough to detect movement of a portion of the pattern across the stylus field of view during the fastest expected stylus movements. Given a stroke speed of 10 inches per second and a pixel pitch of 100 pixels per inch, the stylus moves over pixels at a rate of 1000 pixels per second. A sample rate of 2000 images per second may be sufficient to detect incremental sub-pixel movement, and thus to count each pixel moving through the stylus field of view even with a uniform colored background.

Uniformly bright pixels in the background of a display image may present the worst-case scenario for detecting fast stylus movements. Movement over images, or over a halftoned or "textured" backgrounds, can allow measurement with a lower sampling rate and lower stylus image detector resolution. As such, when the application permits, it may be preferable to design the system so that the display provides images that allow for the desired resolutions at the desired sampling rate. For example, if a stylus of the present invention were used in a signature capture application, a displayed pattern in the background of the signature area could be used to allow measurement of faster strokes with lower image detector sampling rates. Application software may not generate the patterns useful for detection by the optical stylus, so display driver software or display hardware may be adapted to produce desired patterns independent of application software.

Stylus optical detectors may detect and measure lighted (active) pixels more accurately than dark (inactive) pixels. Therefore, the field of view of the stylus is preferably large enough to include several lighted pixels when the stylus is pointed at a dark image on the display. Typical dark images include characters or lines on a background that includes at least some lighted pixels. A field of view (FOV) of about 30 pixels in diameter may be sufficient to detect lighted pixels at the edges of most dark images. Where large dark areas are generated by application software, application-independent driver software or display hardware can be used to provide a pattern of pixels that are measurable by an optical stylus.

The tilt angle of an optical stylus may be determined by measuring the aspect ratio of the image within the stylus field of view, in units of pixels and sub-pixels. For example, FIG. 1 shows circle 18 that spans five pixels horizontally and five pixels vertically, indicating the field of view of a vertical stylus (i.e., held normal to the display surface). Ellipse 19 spans seven pixels horizontally and five pixels vertically, indicating the field of view of a stylus that is tilted horizontally at about 45 degrees from normal toward the horizontal display axis. The views shown in areas 18 and 19 are illustrative and not necessarily to scale (i.e., they may not represent the optimal field of view of stylus 52).

Figure 4:
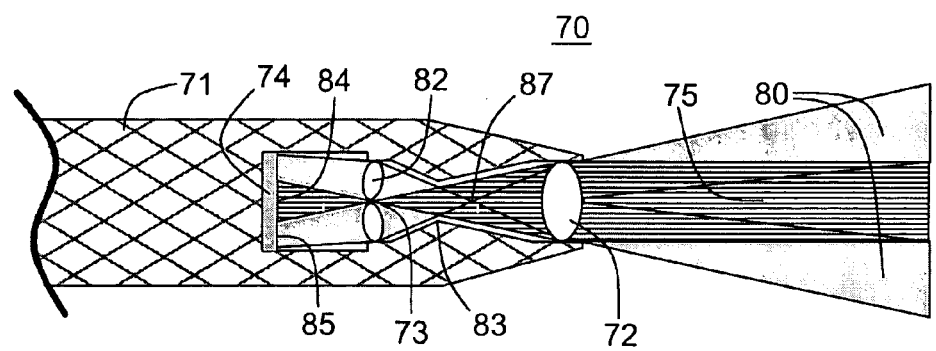
FIG. 4 shows a schematic cross-section of an optical stylus that may be used in the present invention.

FIG. 4 depicts a cross sectional view of an optical stylus 70 having a secondary FOV to augment primary optics such as shown in FIG. 3. The second lens 82 is doughnut shaped, with aperture 73 through its center. A parallel, collimated beam of light can be focused by first lens 72 to a focal point in aperture 73, forming an image on the center of image detector 74. Conical beam of light 80 passes through lens 72 to a focal point 87 near aperture 83. Conical light pattern 80 then passes through lens 82 where it is focused onto the perimeter of image detector 74. Thus two images are formed on image detector 74, as illustrated in FIG. 5, one in the center 84 of the image detector 74, and one around the periphery 85 of the image detector 74.

Figure 5:
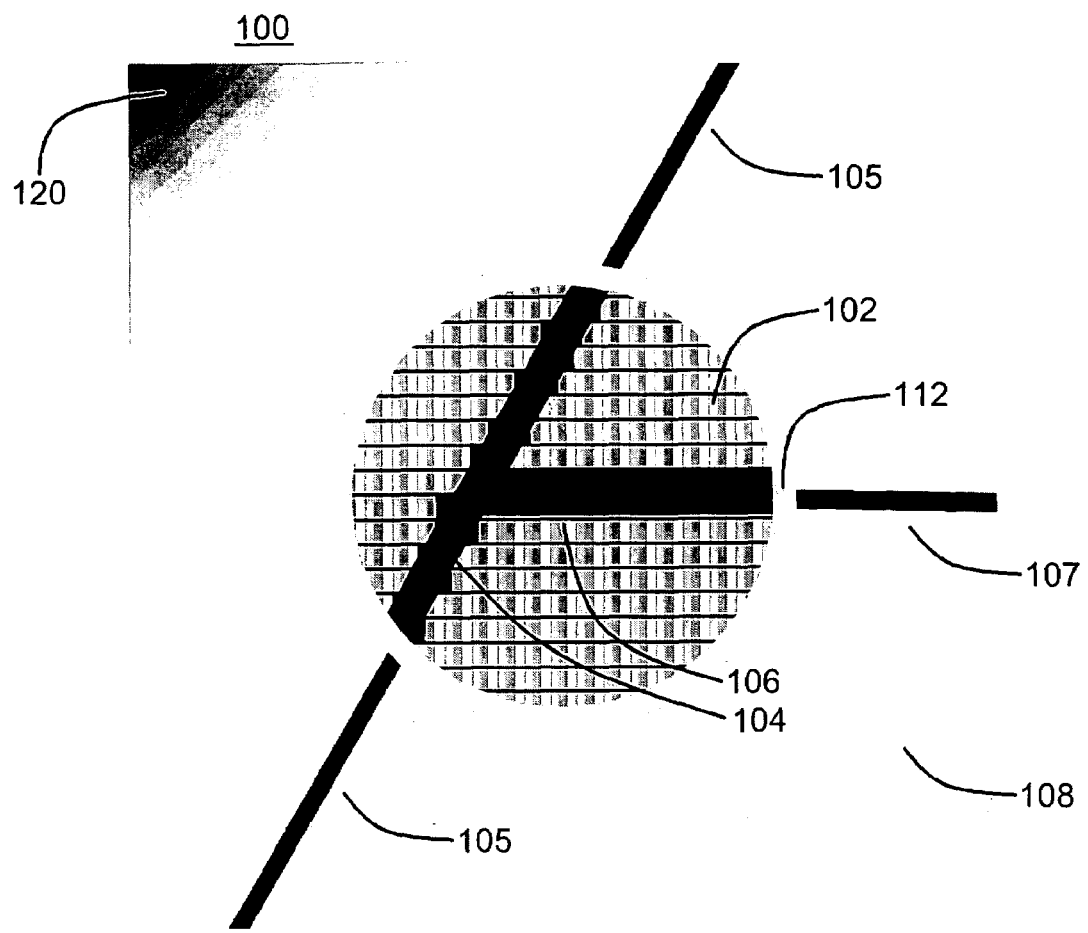
FIG. 5 schematically depicts an area as imaged by an optical stylus such as shown in FIG. 4.

FIG. 5 depicts an example of an image projected onto image detector 74 shown in FIG. 4. In the center is image FOV 102, which has the individual sub-pixels sharply focused. The image in FOV 102 comes from collimated light 75 (see FIG. 4). Lines 104 and 106 represent black lines displayed on a white background. Outer FOV area 108 receives the light from cone 80 that passes through lens 82. This light in outer FOV 108 is not as well focused as center FOV 102, so individual RGB sub-pixels may not be distinguished, thus merging into a uniform background. Displayed lines 104 and 106 that are highly focused in FOV area 102 may also be discerned as lines 105 and 107 respectively. Lines 105 and 107 are less focused, but still visible and their movement across FOV 108 may be measured. Between FOV 102 and FOV 108 is a dead space 112 where little or no light is focused. In the upper left corner of outer FOV 108 is a shadowed area that represents a portion of a dark displayed image. A dark area such as 120 may also be the edge of a display or of a displayed window.

Referring again to FIG. 4, light received by the optical stylus can be used in several ways. Conical beam 80 can gather more or less light depending on the height of the stylus 70 from a light emitting display, whereas collimated beam 75 changes little with stylus distance from the display. Thus the ratio of total light striking area 84 versus total light in area 85 may be used as a measure of stylus height above a display.

FOV 108 may be projected onto the same image detector as FOV 102, or a separate image detector or light detector may be used. For example, stylus height measurement may be accomplished if FOV 108 were measured with four equally spaced light detectors rather than a full image detector, the average light intensity correlating with stylus height.

The area of FOV 108 is larger than the area of FOV 102, so images moving through FOV 108 at a rapid rate may be measured over a longer period of time than images in FOV 102, though with less accuracy than images in FOV 102. This allows measurement of moving image features such as lines 105 and 107 with a lower sample rate in image detector 74. The wider range of FOV 108 also allows measurement of larger image features. For example, in FIG. 5 FOV 102 is 16 pixels wide. Movement over a dark spot or line 20 pixels wide leaves all of FOV 102 in the dark for a portion of the time, making measurement of movement more difficult during that time. During such an event, movement across FOV 108 may still be measured, with a small reduction in accuracy, so that the stylus can still be tracked.

Rate of movement and acceleration may also be used to track stylus position. In an example given above, FOV 102 is 16 pixels wide and movement over a dark spot or line 20 pixels wide leaves all of FOV 102 in the dark. If movement across the 20 pixel feature is continuous, (with minimal acceleration while over the 20 pixel spot), then the rate and direction of movement can be measured while approaching the spot and again after the spot has passed under the stylus FOV. By assuming minimal acceleration while over the spot, the distance across the spot can be estimated and thus the total dead reckoning position of the stylus can still be calculated even without using secondary optics. Small errors accumulated by such estimates can be corrected when the stylus locates a displayed feature with a known location, such as a cursor.

Figure 6:
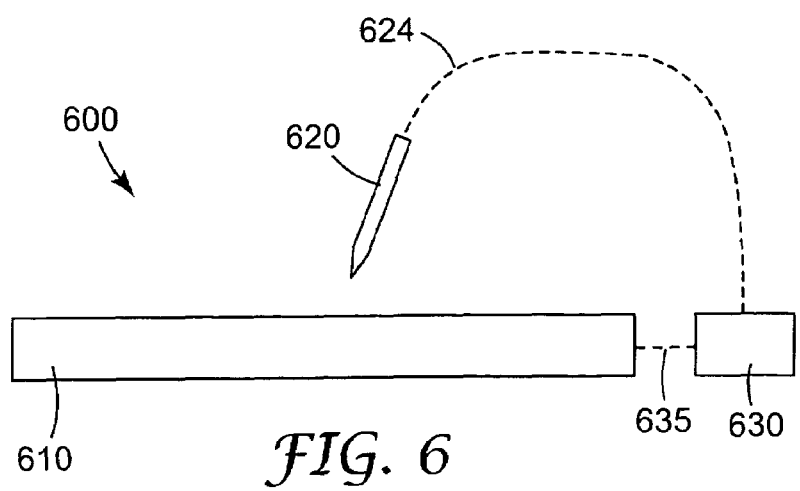
FIG. 6 schematically shows a digitizer system of the present invention.

FIG. 6 schematically illustrates a digitizer system 600 according to the present invention. Digitizers systems can include any system where it is desirable to provide for pen or stylus based input, and in particular to those where the capability of detecting the stylus hovering over the display as well as contacting the display is desirable. Such systems include tablet computers.

System 600 includes a pixilated display 610, an optical stylus 620 capable of imaging the display pixels, and controller electronics 630 configured to determine stylus position or orientation information based on information transmitted from the stylus. Signals can be communicated between electronics 630 and stylus 620 through communications channel 624, which may be wired or wireless. A wired communications channel 624 may take the form of a cable tethering the stylus to the system. Alternatively, at least a portion of the electronics 630 may be contained within the stylus housing. Wireless communications include the use of radio frequency (RF) signals, acoustic signals, or light signals. Similarly, electronics 630 and display 610 can communicate information via communications channel 635, which is commonly hard wired but may alternatively be wireless. Stylus 620 may be powered by an internal power source such as a battery, which may be rechargeable (for example, when docked with a host device), or could use an RF wireless power source.

The foregoing description of the various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A digitizer system comprising:
    a display device comprising a plurality of pixels;
    an optical stylus configured to image the pixels within a field of view; and
    electronics in communication with the optical stylus and configured to count a number of pixels passing through the field of view and to determine a distance and direction of travel of the optical stylus based on the counted number and a direction of the pixels passing through the field of view.

2. The digitizer system of claim 1, wherein the display device is a liquid crystal display that includes a pattern of vertical red, green and blue (RGB) color stripes and horizontal masking lines that separate the pixels from each other, and wherein the electronics are configured to count the RGB color stripes horizontally and to count the masking lines vertically.

3. The digitizer system of claim 1, wherein the electronics are further configured to determine the distance of travel of the optical stylus by counting a number of pixels that pass through the field of view as the optical stylus travels from a reference location to a current location and to determine the direction of the travel of the optical stylus by determining an orientation of the pixels that pass through the field of view as the optical stylus travels from the reference location to the current location, and wherein the display device is an electroluminescent display.

4. The digitizer system of claim 1, wherein the display device is a cathode ray tube display that includes a repeating pattern of red, green and blue phosphor dots that are separated by a black shadow mask, and wherein the electronics are configured to count the repeating pattern of dots horizontally or vertically.

5. The digitizer system of claim 1, wherein the field of view is a circle.

6. The digitizer system of claim 1, wherein the field of view is a ring.

7. The digitizer system of claim 1, wherein the field of view is a cross.

8. The digitizer system of claim 1, wherein the optical stylus comprises a tip switch for determining whether the stylus is in contact with a surface.

9. The digitizer system of claim 8, wherein the tip switch is further configured for determining an amount of pressure applied when the optical stylus is in contact with a surface.

10. The digitizer system of claim 1, wherein the optical stylus comprises first optics and second optics such that the field of view includes a central field of view associated with the first optics in which the pixels are individually discernable and a peripheral field of view associated with the second optics having a lower magnification for discerning displayed features larger than the pixels.

11. The digitizer system of claim 1, wherein the electronics are further configured to determine the stylus rotation orientation based on the position of the pixels relative to each other.

12. The digitizer system of claim 1, wherein the electronics are further configured to determine the stylus tilt angle based on the shape of the image detected by the optical stylus.

13. The digitizer system of claim 1, wherein the electronics are further configured to determine the stylus height above the display surface by measuring the total amount of light entering optics of the optical stylus.

14. A method of detecting stylus position relative to a pixilated display device comprising the steps of:
   imaging the display pixels using optics and a detector housed by the stylus, the optics and detector providing a field of view; and
   obtaining stylus position relative to a reference point by counting a number of pixels passing through the field of view and by determining a direction of the pixels passing through the field of view.

15. The method of claim 14, further comprising
   determining the reference point;
   determining a distance of travel of the-stylus by counting a number of pixels that pass through the field of view as the stylus travels from the reference point to a current point; and
   determining a direction of the travel of the stylus by determining an orientation of the pixels that pass through the field of view as the stylus travels from the reference point to the current point.

16. The method of claim 15, wherein determining the reference point comprises using the display to display a coded pattern indicative of position that can be imaged by the stylus to determine absolute position.

17. The method of claim 14, further comprising using secondary optics housed by the stylus to image displayed features larger than the pixels.

18. The method of claim 14, further comprising determining stylus height over the display based on intensity of light reaching the detector.

19. The method of claim 14, further comprising performing a calibration step to determine characteristics of the pixels.

* * * * *

UNITED STATES PATENT AND TRADEMARK OFFICE
CERTIFICATE OF CORRECTION

| | | |
|---|---|---|
| PATENT NO. | : 7,646,377 B2 | Page 1 of 1 |
| APPLICATION NO. | : 11/123529 | |
| DATED | : January 12, 2010 | |
| INVENTOR(S) | : Bernard O. Geaghan | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 984 days.

Signed and Sealed this

Sixteenth Day of November, 2010

David J. Kappos
*Director of the United States Patent and Trademark Office*